Sept. 5, 1944.　　　　J. R. BENFORD　　　　2,357,378

MICROSCOPE ILLUMINATOR

Filed Dec. 1, 1941

JAMES R. BENFORD
INVENTOR

BY *W. A. Ellestad*
*Moreau B. Berg*
ATTORNEYS

Patented Sept. 5, 1944

2,357,378

UNITED STATES PATENT OFFICE 2,357,378

MICROSCOPE ILLUMINATOR

James R. Benford, Rochester, N. Y., assignor to Bausch & Lomb Optical Company, Rochester, N. Y., a corporation of New York Application December 1, 1941, Serial No. 421,157

3 Claims. (Cl. 88—40)

The invention is concerned with optical instruments, such as microscopes, and more particularly has reference to a device adapted to illuminate an object which is positioned in the field of view of the instrument.

One of the objects of my invention is to provide an improved illuminating device for use with a microscope. Another object is to devise a microscope illuminator wherein a tubular body, which is formed of a transparent plastic, is shaped to provide condensing lens means and is constructed with lens supporting means within its bore whereby to permit an objective lens system to be mounted therein. Still another object resides in the provision of a one-piece body design for a microscope illuminator which allows the body thereof to be shaped from transparent material of a nature which is readily workable and which may be machined and otherwise finished to small tolerance limits. A further object is to provide a device of the character described which may be attached directly to a microscope.

Other objects and advantages incident to my improvements reside in certain novel features of construction, arrangement and the combination of parts to be hereinafter more fully set forth and claimed.

To make my invention more clearly understood, I have shown, in the accompanying drawing, means for carrying the same into practical effect without limiting the improvements in their useful applications to the particular constructions which, for the purpose of explanation, have been made the subject of illustration.

With reference to the drawing.

Throughout the drawing, similar reference numerals are used to indicate similar parts in the different views.

Figure 1:
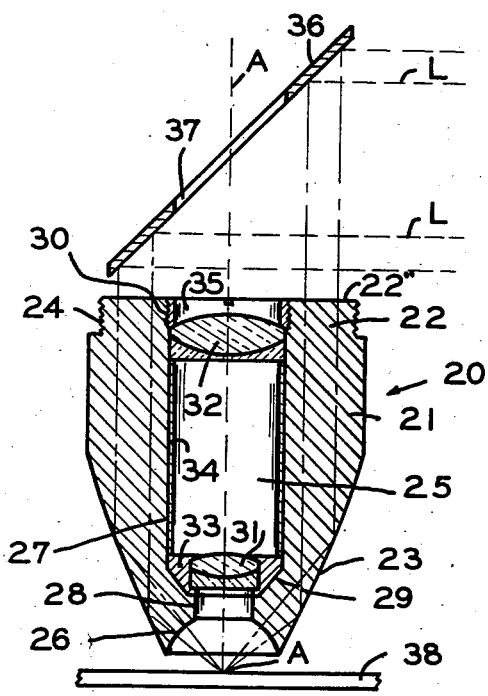
Figure 1 shows, in detail, a sectional elevation of one form of my illuminating device while schematically illustrating its mode of operation.

There is illustrated in Figure 1 an illuminator having a transparent tubular body 20 which has optically smooth surfaces. The intermediate or main portion 21 of the body 20 is joined, at one end, by a reduced threaded portion 22 and by a tapered portion 23 at the other end. A cylindrical cross section is given to the main portion 21 and the reduced portion 22 of the illuminator body. The reduced portion 22 is threaded as indicated at 24 and has its end away from the main portion 20 shaped to provide the entrance surface 22″. It is through this surface that an illuminating beam of light enters the body of the device and while it is shown as plane, it may be given a concave or a convex curvature so as to refract the entering beam. Threaded portion 24 is preferably formed with some standard thread, for example, the Society thread for use with a microscope, so that the illuminator may be detachably secured to a nosepiece or other standard threaded part of an instrument.

The external surface of the optically smooth tapered portion 23 is given a contour of a total reflecting curve. This permits rays of light, which enter the wall of the body 20 at the entrance surface 22″ and in substantially parallel relation to the longitudinal axis of the body, to be internally reflected towards such axis. The bore 25 which extends through the body 20 is provided at its end where it joins the tapered end of the body with a concave exit surface 26 which is curved to provide a suitable lens means for the illuminator. Lens surface 26 is positioned and shaped to intercept the light rays reflected from the surface of the tapered portion 23 and to direct them toward the specimen at some location on the longitudinal axis of the illuminator which lies outside of its body.

Bore 25, which is aligned with the longitudinal axis of the body 20, has two cylindrical sections 27 and 28 of unequal diameter between which a conical section 29 is interposed to provide a lens seat. The larger diametered section 27 of the bore provides a compartment for the objective lens system of the illuminator. As indicated at 30, the end of the section 27, adjacent the reduced portion of the illuminator, is threaded to receive retaining means for holding the objective lens system within the bore 25. One end of the cylindrical section 28 of bore 25 opens into the conical section 29 while its other end is joined to the concave portion which provides the lens surface 26 at the exit end of the illuminator.

The body 20 is formed of any suitable transparent plastic. Besides possessing the property of transparency, the material chosen should be substantially optically clear, should be of a nature which allows it to be easily and accurately worked by machining operations which include threading, cutting, turning, boring or the like, and should not be subject to undesirable dimensional changes upon aging. Also the plastic chosen should have the characteristic of forming optically smooth surfaces when it is processed or the plastic should be of a nature which permits mechanical polishing to obtain such surfaces. While the methods used to shape the body 20 are not a part of my invention, it may be mentioned that the body may be molded or cast. In general, the invention comprehends the use of an illuminator body which is formed of either a thermosetting or a thermoplastic resin. To name a few suitable plastics, methyl methacrylate, urea formaldehyde, and cellulose acetate resins may be mentioned.

One practice in molding or casting the body 20 forms the cylindrical and conical sections of the bore 25 with undersized diameters and then machines these sections to desired dimensions although they may be formed to size when molding or casting the body. Preferably, from the standpoint of accuracy, threads 24 and 30 are cut in the body of the illuminator although it is possible to shape them in the body during the formation of the latter. Commonly used procedure forms the reduced portion 22 of the body by machining operations prior to cutting the threads 24 but it may also be formed when the body is cast or molded. Accurate location of the shoulder between the reduced portion 22 and the main portion 21 of the body 20, whereby to control the length of the body, may be made when cutting the threads 24.

The objective lens system used with the illuminator body 20 comprises doublets 31 and 32 which are held in the bore 25 in alignment with each other and with the longitudinal axis of the bore. Doublet 31, which provides the front component for the system, is carried in a lens mount 33 having a conical outer surface which seats in the conical portion 29 of the bore 25. Both lens components are separated by a tubular spacer 34, one end of which seats on the lens mount 33 while the other end thereof provides a seat for the doublet 32. The spacer 34, which has a diameter substantially equal to that of the section 27 of the bore, provides the usual means for separating the lens components of an objective lens system. An externally threaded ring 35 is adapted to engage the threaded portion of the central bore of the illuminator body in order to retain the lens system in mounted condition. It is to be observed that my invention provides a one-piece mount for the objective lens system and does away with complicated constructions which employ a multi-piece shell provided with a separate support therein for the purpose of carrying the objective.

Figure 1 diagrammatically discloses the operation of the illuminator besides showing its structural details. The illuminator is therein illustrated in its operating position wherein its longitudinal axis coincides with the optical axis AA of the instrument with which it is associated. Threads 24 permit the illuminator to be detachably secured to the body tube of the microscope, a casing attached to the body tube or to the microscope nosepiece, none of these just mentioned parts being shown in the drawing.

A plate reflector 36 having an opening or clear glass space 37 may be employed with the illuminator and is held in a position inclined to the optical axis of the instrument and at a location between the illuminator and the eyepiece of the instrument. Reflector 36 is mounted within the body tube or in any casing attached thereto or in the nosepiece of the instrument by any suitable construction. Such a construction is well known to the art and includes means such as an opening in a wall thereof whereby substantially parallel light rays L from a laterally disposed source, not shown, may be directed onto the reflector 36 in the manner illustrated. Other reflecting means, such as prisms, may be used in place of the plate reflector 36.

Reflector 36 is so constructed and aligned with the illuminator that it reflects the rays of light L in the form of an annular beam which is directed towards the reduced end of the body 20. This beam enters the wall of the illuminator body 20 through entrance surface 22" in surrounding relation to the bore 25 so that none of the rays are directed by the reflecting means 36 through the objective lens system in the bore 25. Rays L travel through the wall of the illuminator body 20 towards the tapered exit end thereof while being maintained in parallel relation until they strike the total reflecting surface of the tapered portion 23. The surface of the tapered portion 23 reflects and converges the rays L towards the optical axis AA.

By suitably designing and locating the surfaces 22", 23 and 26, light rays reflected from the tapered portion of the illuminator body are intercepted and focused onto a specimen 38 which is diagrammatically shown as positioned adjacent the tapered end of the illuminator. Light rays which illuminate the specimen and are specularly reflected thereby, travel in a general direction which is symmetrically disposed about the optical axis. A portion of these rays which are diffusely reflected or scattered by the specimen 38, enter the bore 25 to pass through the objective lens system and along the axis AA to an ocular, not shown, but which is associated with the instrument. This produces a "dark-field" appearance, as will be well understood by those skilled in the art.

Figure 2:
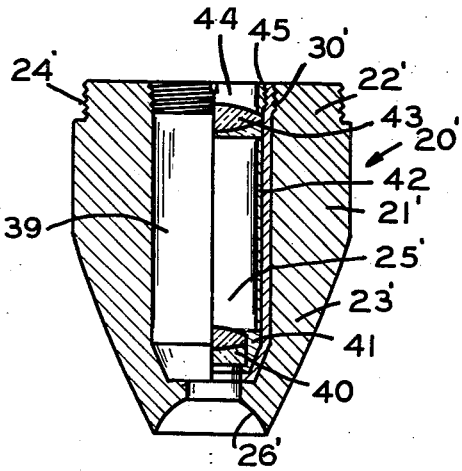
Figure 2 is a partial sectional elevation of a device similar to that of Figure 1 but shows modified means for mounting the objective lens system of the device.

In Figure 2 I have disclosed an illuminator having a body 20' substantially like the body 20 in that it is formed of plastic material and is designed to have a main portion 21', reduced portion 22' also shown with a plane entrance surface, tapered portion 23', bore 25', lens surface 26' and threaded sections 24' and 30' all similar to corresponding parts of the illuminator body shown in Figure 1. The essential difference between this form of the invention and that of Figure 1 resides in the means for mounting the objective lens system of Figure 2. As shown in the latter figure of the drawing, the objective lens means is carried in a cylindrical casing 39, usually of metal, which is provided with a conical shaped end adapted to seat in the conical section of the bore 25'. The use of threads on the other end of the casing 39 permits it to be secured within the bore 25' in its mounted position shown in Figure 2.

Casing 39 provides means for mounting the objective lens system within the bore of the illuminator body as a unit. In effecting this, the front lens component 40 of the lens system is carried in a mount 41 which is seated in the conical section of the casing 39. Tubular spacer 42, seated on the mount 41, provides means for separating the components of the system and also a seat for the back lens component 43. The objective lens system is retained in the casing 39 by a retainer ring 44 which engages threads 45 formed on the end of the casing adjacent the reduced portion 22' of the illuminator body.

Figures 1 and 2 have disclosed a two-component lens system which is adapted to provide an objective of the type having an equivalent focus of 16 mm. The invention is, however, in nowise limited to the use of such a system. It will be apparent that by slight structural changes, the more complex and higher power lens systems which require a greater number of components than the system which has been illustrated, may be readily incorporated in the designs heretofore disclosed. For that matter, the forms of the invention illustrated in Figures 1 and 2 comprehend the use of an objective system formed of a single lens component. Operation of the illuminator shown in Figure 2 is similar to that of the device illustrated in Figure 1.

Figure 3:
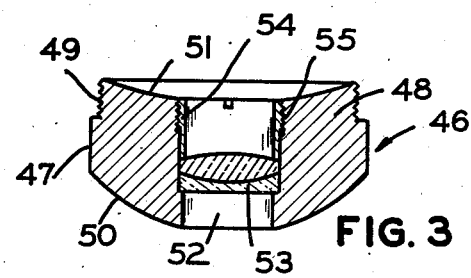
Figure 3 is a vertical sectional view of a modified form of illuminator.
Figure 4:
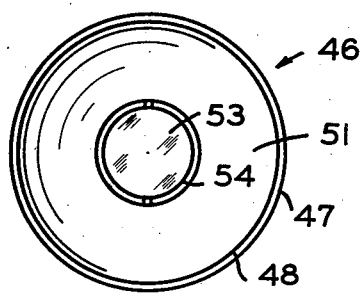
Figure 4 is a plan view of the illuminating device of Figure 3.

Another embodiment of the illuminator is disclosed in Figures 3 and 4 wherein a device of this character is shown as comprised of a tubular body 46 having the main portion 47. At one end of the latter, there is provided the reduced portion 48 which is externally threaded as at 49 with a suitable standard thread. The other end of the body 46 is provided with an exit surface 50 and the end of the body at the reduced portion 48 is formed with an entrance surface 51. In Figure 3 the entrance surface 51 is shown as a concave lens surface while the exit surface 50 is shown as a convex lens surface. If desired, one of these surfaces may also be plane. In fact, the invention includes any combination of shapes for the end surfaces 50 and 51 which will provide a converging lens system.

Body 46 has the centrally located bore 52 which is comprised of two cylindrical sections of unequal diameters, the shoulder formed at the juncture of these sections being adapted to provide a seat for a lens component 53 which forms the objective lens system of the device. Lens component 53 is seated in the bore so that its optical axis coincides with the longitudinal axis of the bore and is retained in this position by a threaded retainer 54 which engages with the threaded portion 55 formed in the end of the bore adjacent the concave lens surface 51.

Any suitable plastic, such as those described, may be used for the construction of the body 46 which is formed by practices like those detailed in connection with the construction of the illuminator body 20. The illuminator of Figure 3 is adapted to be attached to an instrument and to operate in a manner similar to the illuminators heretofore described except that the annular illuminating beam is not internally reflected in its passage through the wall of the illuminator body 46. In this regard, the surface 51 refracts the annular beam which enters the illuminator body and directs this beam towards the surface 50. The latter again refracts the beam and directs the rays thereof onto the specimen which reflects the beam in the same manner as previously described in reference to Figure 1, thus giving dark-field illumination.

The illuminator of Figures 3 and 4 is especially adapted for low power work and provides an excellent design with which a 32 mm. objective may be associated. In low power work it is desirable to illuminate a spot rather than a point on the specimen. This condition may easily be attained by design of the curves of the lens surfaces 50 and 51. For that matter, the size of the area on the specimen illuminated by the form of the invention shown in Figure 1 may be increased or decreased in accordance with the curves selected for surfaces 22'', 23, and 26.

The embodiment of Figure 3 illustrates the use of an objective system of a single component as well as the formation of a lens seat in the body of the illuminator which permits a lens component to be directly seated therein without the use of a separate lens mount. Although illustrative of use with a single lens component, it will be understood that the body design for the illuminator of Figures 3 and 4 is not restricted to this practice but by slight modification of the central bore may have a plurality of lens components mounted therein.

From the foregoing it will be appreciated that I have provided an improved illuminating device which follows a simple design and which is formed of transparent plastic. Moreover, the invention has attained its aims and objects by providing a one-piece illuminator body of a type which may be readily and accurately machined within small tolerance limits to finished dimensions. Since the body of my illuminator is made of a transparent material and has its threaded attaching portions 24, 24' and 49 formed directly in the body, there are no metallic rings or walls to limit the diameter of the tubular beam of light rays which passes down through the illuminator. Consequently, greater illumination of the object is attained.

I claim:

1. An illuminator for use with a microscope, said illuminator comprising a tubular body formed of a transparent plastic, objective lens means positioned in the bore of said body to have its optical axis in coincidence with the longitudinal axis of the body, external threads formed on said body adjacent one end thereof whereby the illuminator may be attached to a microscope, said body having a tapered portion adjacent its other end, the end of said body adjacent said threads forming an entrance surface through which rays of an annular light beam may enter the wall of said body, the external surface of said tapered portion providing a reflecting surface which is located to intercept said rays in their travel through the wall of said body and to reflect them towards the end of said body adjacent said tapered portion, said last mentioned end of said body forming an exit surface through which said rays leave said body, said entrance surface being shaped to direct entering rays onto the reflecting surface of said tapered portion and said exit surface being shaped to direct rays emerging from the wall of said body into the field of view of said objective lens means.

2. An illuminator for use with a microscope, said illuminator comprising a tubular body of a transparent plastic, objective lens means carried in the bore of said body, said objective lens means so carried within the bore of said body that its optical axis is coincident with the longitudinal axis of said body, means integrally formed with said body adjacent one end thereof for attaching the body to the microscope, the annular end face of said body adjacent to said means forming an entrance surface for rays of light directed thereto, the rays entering said body passing longitudinally therethrough, the opposite end face of said body forming an exit surface, through which said rays pass, said entrance and exit surfaces being shaped to direct said rays onto the object to be viewed through said objective lens means.

3. A microscope illuminator of the type wherein light rays of an annular shaped beam of light are directed around objective lens means employed to view an object and onto the object to illuminate the latter, the combination of a tubular body of transparent plastic, the one end portion of said body being reduced and externally threaded for attachment to a microscope, objective lens means seated within the bore of said body with the optical axis thereof coincident with the longitudinal axis of said body, a threaded portion located in said bore adjacent to the reduced end portion of the body, means engaging such threaded portion for holding said objective lens means in the bore, the annular end face of the reduced end portion of said body forming an entrance face through which light rays enter said body, the opposite end face being so shaped that light rays emerging therethrough are directed to an object located in alignment with said objective lens means.

JAMES R. BENFORD.